United States Patent

Cochran

[15] 3,645,676

[45] *Feb. 29, 1972

[54] PRODUCTION OF MONOCALCIUM ORTHOPHOSPHATE

[72] Inventor: Linden Wayne Cochran, Basking Ridge, N.J.

[73] Assignee: Multi-Minerals Limited, Toronto, Ontario, Canada

[ * ] Notice: The portion of the term of this patent subsequent to Feb. 10, 1987, has been disclaimed.

[22] Filed: Mar. 4, 1969

[21] Appl. No.: 804,276

[52] U.S. Cl. .................................................23/109, 23/165
[51] Int. Cl. ..................................C01b 25/22, C01b 25/32
[58] Field of Search................................23/108, 109, 165 C

[56] References Cited

UNITED STATES PATENTS

| | | | |
|---|---|---|---|
| 2,334,904 | 11/1943 | Cheetham | 260/45 |
| 2,567,227 | 9/1951 | Miller | 23/109 |
| 3,374,055 | 3/1968 | Villalon | 23/107 |
| 3,494,735 | 2/1970 | Cochran | 23/165 |

*Primary Examiner*—Earl C. Thomas
*Assistant Examiner*—Gregory A. Heller
*Attorney*—Norman M. Holland

[57] ABSTRACT

A multicycle process for the continuous production of high-purity monocalcium orthophosphate which may, if desired, be used as a fertilizer material. The monocalcium orthophosphate is produced by the digestion of phosphate raw material with phosphoric acid to form a solution containing monocalcium orthophosphate which is then crystallized and recovered from solution. A portion of the recovered salt is removed as the end product. The remaining portion is contacted with a cationic exchange resin on the hydrogen cycle to produce phosphoric acid which is recycled for use in the digestion of more phosphate raw material.

4 Claims, No Drawings

PRODUCTION OF MONOCALCIUM ORTHOPHOSPHATE

CROSS REFERENCE

The present application is an improvement over my U.S. Pat. application Ser. No. 386,764 filed July 31, 1964, now U.S. Pat. No. 3,494,735.

DESCRIPTION

The present process is directed to a method for the continuous production of high-purity monocalcium orthophosphate, which is commonly referred to as triple super phosphate, and which is suitable for use in high-analysis fertilizers.

It has been a common practice to produce phosphate salts suitable for use in fertilizers from the so-called "wet process" phosphoric acids, namely those produced by the acidic digestion of phosphate raw material with strong mineral acids. An example of such a process is shown in U.S. Pat. No. 3,044,851. Unfortunately, such a product is more impure than desired in high-grade fertilizers since it contains all the additional anionic impurities derived from the initial reaction of the strong mineral acid and phosphate raw material.

In view of this shortcoming, a number of processes which utilize phosphoric acid as the digesting acid to produce monocalcium orthophosphate have been developed. Examples are found in U.S. Pat. Nos. 2,899,292; 2,914,380; 2,567,227 and 3,374,055. However, in none of these processes was it appreciated that the reaction conditions should produce a solution of monocalcium orthophosphate which can be easily removed from the mother liquor with a portion used as the end product while the remaining portion of monocalcium salt is contacted with an ion exchange resin to produce phosphoric acid which can be recycled to subsequent digesting steps.

It is an object of this invention to provide a process which is suitable for production of high-quality monocalcium orthophosphate fertilizer material.

It is another object of this invention to provide a multicycle process for the production of monocalcium orthophosphate which is continuous with respect to the production of that salt.

These and other objects not explicitly set forth in this specification or the appended claims will become obvious to one skilled in the art upon examination of the embodiment about to be described or upon use of the invention in practice.

The present process is directed to production of monocalcium orthophosphate by the acidic digestion of phosphate raw material, such as apatite, with phosphoric acid.

The reaction conditions should be such that a solution containing recoverable monocalcium orthophosphate is produced. Preferably, the digesting acid should be between about 55 percent and 85 percent $H_3PO_4$ and the digestion temperature is maintained from about 85° C. to about 105° C. A suitable process is described in Belgian Pat. No. 657,470. In order to aid in the removal of fluorine contaminants contained in the raw material air-sparging currents can be introduced into the digestion medium. Other steps may also be used to further remove fluorine contaminants either in lieu of or in combination with the sparging technique. For example, addition of silica to the digestion medium, and the application of a slight negative pressure to the digester further aid in the removal of volatile contaminants.

The monocalcium orthophosphate product contained in the solution is then crystallized from solution by allowing the solution to cool to between 70° C. and 85° C. The crystals may then be recovered by conventional filtration or centrifugation and decantation procedures. They may be washed with either an aqueous or phosphoric acid solution saturated with monocalcium orthophosphate or concentrated phosphoric acid to remove entrained contaminants.

Once the monocalcium orthophosphate salt has been recovered a portion is used as the desired end product of this process. The remaining portion is contacted with a cationic exchange resin on the hydrogen cycle to convert the salt to phosphoric acid. The salt may be contacted while in the crystalline state of after solubilization in a suitable solvent such as described in Belgian Pat. No. 657,470. This highly pure acid is recycled for use in the digestion step. The result is a multicycle process which continuously produces monocalcium orthophosphate while at the same time producing a sufficient amount of acid for use in later cycles. The process is illustrated by the following example:

EXAMPLE

Approximately 50 liters of mother liquor was prepared by reacting 80 percent $H_3PO_4$ with Kola apatite at a temperature of about 100° C. The reaction vessel was agitated with a mechanical stirrer throughout the reaction interval and the solution was air sparged to assist in removal of liberated fluorine. The solution was continuously cycled between two 30-liter containers, passing through a filter device en route from the reaction vessel to the holding vessel. Apatite was fed to the reactor at a constant rate of about 100 grams per minute, and the solution was cycled at a rate of 1 liter per minute..

As soon as visible crystals of monocalcium orthophosphate appeared in the reactor the filtering unit was activated. The crystalline monocalcium orthophosphate was filtered from the natant mother liquor, washed with 65 percent weight percent $H_3PO_4$, weighed and reserved for further treatment as indicated below.

Approximately 2,325 grams of monocalcium orthophosphate was filtered from 3.88 liters of mother liquor. The filtered crystals were washed with 1,715 milliliters of 65 percent weight percent $H_3PO_4$ which had previously been saturated with the monocalcium salt to prevent erosion of the filter cake by the wash acid. The amount of acid used to wash the crystals was the stoichiometric quantity required to produce that amount of monocalcium orthophosphate from apatite at the rates given above. Included in the wash acid was a quantity of acid sufficient to offset that normally lost in the cake through drag-out. This quantity was approximately 20 percent in the system above.

Approximately 1,350 grams or about 60 percent of the product, containing 5.775 equivalents of $Ca^{++}$ion was contacted with 3.21 liters of strong acid ion exchange resin in the hydrogen form (Dowex 50W–X8) to absorb the calcium ion and to convert the salt to phosphoric acid according to the reaction:

$$Ca(H_2PO_4)_2 + RH_2 = 2H_3PO_4 + RCa$$

A total of 1,820 grams of phosphoric acid product were obtained, with a specific gravity of 1.252. This acid, approximately 40 percent weight percent concentration, was then evaporated to 65 percent weight percent for further utilization, first as wash acid, then to react in the reaction vessel with apatite for the further production of monocalcium phosphate.

The remaining 975 grams of monocalcium orthophosphate, or about 40 percent of the salt, representing net product from converting apatite to the monocalcium form, was then available for use either as direct application fertilizer (triple super phosphate, without the usual impurities), for mixing with nitrogenous and potash materials for use as mixed (complete) plant foods, or for further treatment. The monocalcium salt contained less than 50 p.p.m. fluorine similar amounts of iron and no sulfate ion.

As many and varied modifications of the subject matter of this invention will become apparent to those skilled in the art from the detailed description given herein, it should be understood that this invention is to be limited only in accordance with the appended claims.

I claim: orthophosphate

1. In the process for the manufacture of phosphoric acid which comprises digesting a phosphate containing material with phosphoric acid to form a mother liquor containing monocalcium orthophosphate, crystallizing said monocalcium orthophosphate, removing said monocalcium orthophosphate crystals from said mother liquor and contacting said monocalcium orthophosphate crystals with a cationic ion exchange resin on the H-cycle to convert the monocalcium orthophosphate to phosphoric acid, the improvement in which comprises: contacting about 60 percent of the monocalcium orthophosphate with said resin, recycling the phosphoric acid formed by said contacted monocalcium orthophosphate to digest additional phosphate-containing material and removing the uncontacted monocalcium orthophosphate as an end product.

2. A process as claimed in claim 1, in which the digestion is carried out at about 85° C. to about 105° C. using a phosphoric acid of from about 55 percent to 85 percent.

3. A process according to claim 2, in which the phosphate-containing material is apatite.

4. A process as claimed in claim 1, in which the monocalcium orthophosphate is solubilized and is contacted with the resin while it is solubilized.

* * * * *